J. S. DOYLE & F. HEDLEY.
AUTOMATIC ELECTRIC COUPLING MECHANISM FOR CAR LINE CIRCUITS.
APPLICATION FILED JAN. 27, 1912.
1,166,194.
Patented Dec. 28, 1915.
3 SHEETS—SHEET 1.
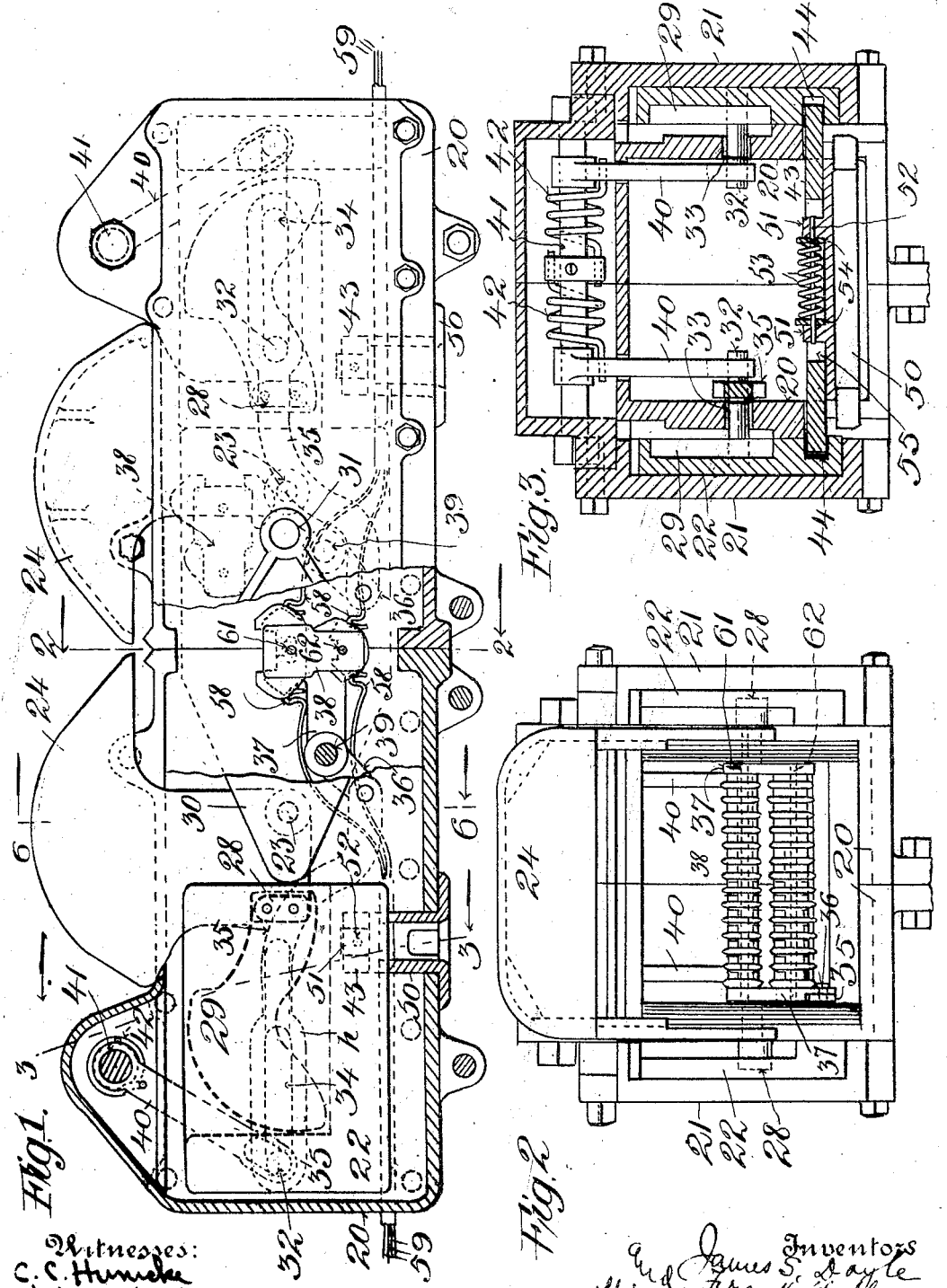

J. S. DOYLE & F. HEDLEY.
AUTOMATIC ELECTRIC COUPLING MECHANISM FOR CAR LINE CIRCUITS.
APPLICATION FILED JAN. 27, 1912.
1,166,194.
Patented Dec. 28, 1915.
3 SHEETS—SHEET 2.
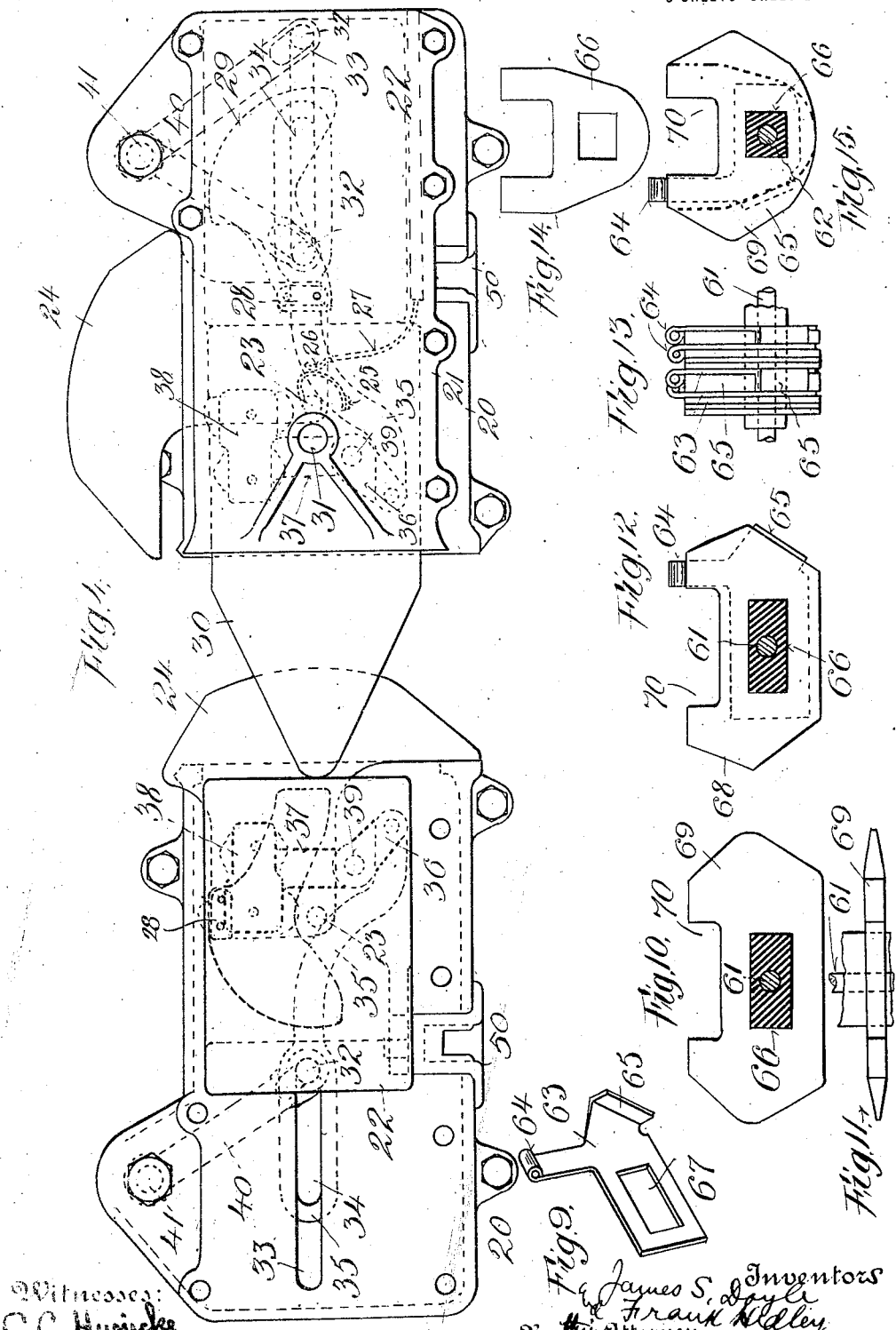

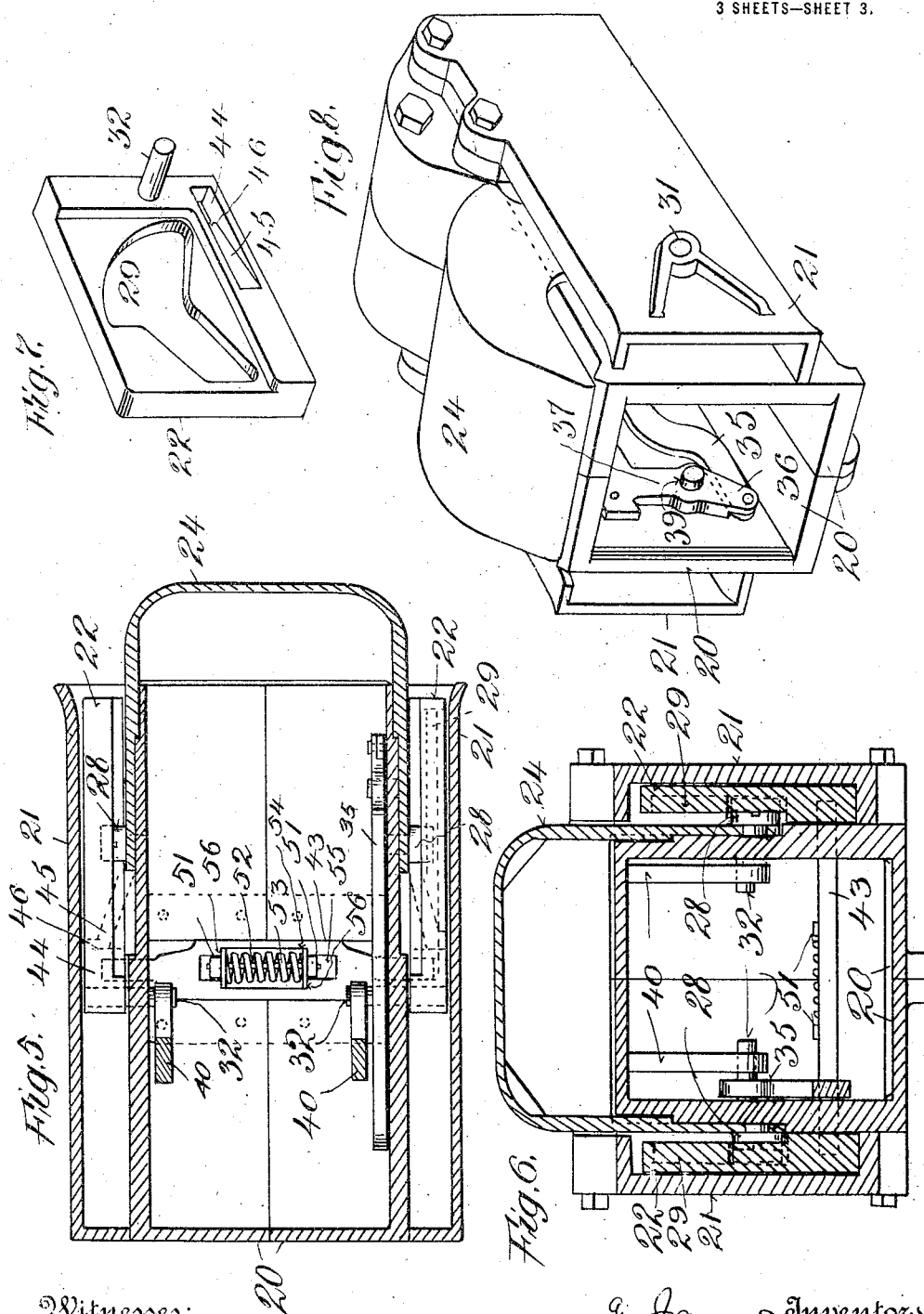

UNITED STATES PATENT OFFICE.

JAMES S. DOYLE, OF YONKERS, AND FRANK HEDLEY, OF MOUNT VERNON, NEW YORK, ASSIGNORS TO THE WESTINGHOUSE AIR BRAKE COMPANY, OF PITTSBURGH, PENNSYLVANIA, A CORPORATION OF PENNSYLVANIA.

AUTOMATIC ELECTRIC COUPLING MECHANISM FOR CAR-LINE CIRCUITS.

1,166,194.  Specification of Letters Patent.  Patented Dec. 28, 1915.

Application filed January 27, 1912. Serial No. 673,740.

*To all whom it may concern:*

Be it known that we, JAMES S. DOYLE and FRANK HEDLEY, both citizens of the United States, residing, respectively, at Yonkers, county of Westchester, and Mount Vernon, Westchester county, and State of New York, have made a certain new and useful Invention in Automatic Electric Coupling Mechanism for Car-Line Circuits, of which the following is a specification.

This invention relates to automatic electric coupling mechanism for car line circuits.

The object of the invention is to provide a coupling mechanism for car line circuits which is simple in construction, automatic and efficient in action, and whereby, when cars are coupled or uncoupled, or a car is added to a train, or removed therefrom, the car line circuits carried by the coupled up, added or removed car or automatically coupled up electrically to, or are uncoupled from, the car line circuits of the next adjacent car, the coupling up of the circuits being accomplished in the proper relation of the circuits.

A further object of the invention is to provide a coupling mechanism of the character referred to which is housed and protected from the ingress of dirt, rain, snow or the like, when the coupling mechanism is not in use, that is, the coupling mechanism which is at the exposed ends of the coupled up cars, such as the rear end of the rear car, or the front end of the front car of the train.

A further object of the invention is to provide a coupling mechanism of the character referred to which prevents the coupling up of cars until the coupling mechanism is placed in proper condition therefor, thereby insuring a proper connection and extension to the car and added car line circuits when such car is added to a train, and preventing a car from being coupled up or added to a train without properly coupling up electrically the car line circuits of the cars.

A further object of the invention is to provide means whereby one or more of the car line circuits may be closed at the front end of the front car or the rear end of the rear car of a train and opened only when another car is coupled up to either of said ends.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the accompanying drawings,—Figure 1 is a view partly in side elevation and partly in longitudinal section, showing the automatic line circuit coupling mechanism, embodying our invention and in coupled up relation. Fig. 2 is an end elevation, of the coupling mechanism for one end of a car looking toward the plane indicated by line 2—2, Fig. 1. Fig. 3 is a transverse section on the line 3—3, Fig. 1, looking in the direction of the arrows. Fig. 4 is a view in side elevation of the coupling mechanism designed to be placed on the proximate ends of adjacent cars the side housing of one coupling being removed, and showing the coupling mechanisms separated but in condition ready to be coupled together. Fig. 5 is a view in longitudinal horizontal section of a coupling mechanism showing the projecting hood or shield in lowered position. Fig. 6 is a view in vertical transverse section on the line 6—6, Fig. 1, looking in the direction of the arrows. Fig. 7 is a detail view in perspective of an operating slide employed in connection with the coupling mechanism. Fig. 8 is a view in perspective of the coupling mechanism. Figs. 9, 10, 11, 12, 13, 14 and 15 are detail views of various parts of the contact carrier.

The same part is designated by the same reference sign wherever it occurs throughout the several views.

In the practical operation of modern electric or other cars, and especially in the operation of the multiple unit system of car trains, a large number of train line circuits are required for the various operations, the integrity of each circuit being required to be maintained throughout the entire train.

Thus, numerous wires are required to extend throughout each car for the motor control mechanism. Other wires are necessary on each car for the control of electro-pneumatic or other form of electrically controlled brake and door operating mechanisms. Circuit wires are also required for the signal system, for the compressor or pump operation, and for various other purposes. It will be seen that since each car of the multiple unit system must have the same equipment of line wire circuits to enable a car to be added to a train, or to be independently operated, as desired, it is necessary that the various train line wires or circuits throughout the train be properly coupled up between adjacent cars, or between the proximate ends of adjacent cars, and in the proper order of relation, otherwise the integrity of the circuits throughout the train of cars would be interrupted and hence there would be a failure to effect the proper train or car operations which are dependent upon the integrity of the circuits throughout the entire train. It will also be seen that where a large number of train line wires or circuits are required, the coupling of the circuits between proximate ends of adjacent cars becomes a matter of very serious importance, since an improper coupling up of one or more of the line circuits might produce disastrous results in the operation of the train. Moreover, without the operation of automatic means for accomplishing the proper coupling up of the train line circuits dependence must be placed upon the care and attention of the train operators in making the couplings. This may lead to equally disastrous results through inattention, carelessness or ignorance on the part of those employed to effect the couplings. Again, where automatic coupling mechanism is employed, there is the danger of access of dirt, rain, snow or the like to the coupling mechanism, and particularly where employed in exposed positions, which are liable to cause trouble or to materially interfere with the integrity of one or more of the train line circuits. Again where the coupling operation is accomplished automatically throughout, the danger is incurred of some of the parts of the coupling mechanism not being in the proper relation at the time the coupling is effected, with a consequent failure to accomplish the coupling up of the circuits in their proper relation. Again, in the case of certain train operations, such for instance, as in the signaling system, the integrity of the circuit throughout the train requires that the circuit be closed at the rear end of the rear car of the train. Under these circumstances, when another car is added to a train it is necessary to open the signaling circuit at the rear end of the rear car of the train, when the other car is added thereto, so as to extend the integrity of this circuit to the rear end of the added car, otherwise cars might be added to a train without extending the integrity of the signaling circuit, thereby making it possible to operate the signal to start the train before the added, or other cars through which the signaling circuit has not been completed, are ready for the train to start, thereby making possible serious if not fatal accidents.

It is among the special purposes of our present invention to provide an automatic coupling mechanism for train line circuits which accomplishes the foregoing and other advantageous results, and which avoids the objections noted, as well as others which constantly arise in the practical operation of electric train service.

In carrying out our invention we propose to mount on each end of each car a coupling mechanism, suitably housed in for protection against dirt, snow, rain or the like, and which embodies automatic features adapted to coöperate with the coupling mechanism on the proximate end of the adjacent car when the two cars are brought together to be coupled up, whereby the integrity of the various car line wires or circuits is extended from the one to the other car and in proper relation with respect to each other.

In order to insure the proper operation of the coupling mechanisms, when the car ends are coupled up, and in order to insure a proper relation of the coöperating parts of the coupling mechanisms themselves, we propose to employ means which requires manual manipulation before the electric car line automatic coupling mechanisms can be made effective. In other words, under normal conditions, the line circuit coupling mechanism at each end of each car is inaccessible to the coupling mechanism on the proximate end of the adjacent car until one or the other of said mechanisms is placed manually in condition for coöperation with the other.

In the accompanying drawings we have shown a simple and practical operative embodiment of means for carrying out the objects and purposes of our invention, but we wish it to be understood that many variations therefrom, and changes in the details thereof, might readily occur to persons skilled in the art, and still fall within the spirit and scope of our invention as defined in the claims. We do not desire therefore, to be limited or restricted to the particular embodiment which we have selected for the purposes of illustrating our invention.

In the drawing 20 designates the inclosing shell for the mechanism of the automatic coupling. For convenience of manufacture, we prefer to employ a shell made in halves or sections adapted to be suitably screwed or bolted together to form an inclosed chamber. Upon each side of the shell, are mounted the housings 21, providing a slide-way extending lengthwise of the shell on the exterior thereof. Operating edgewise within each housing chamber is an operating slide 22. This slide is shown in detached perspective in Fig. 7, and in operation these operating slides move longitudinally through the housing chambers on the exterior of the sides of the shell 20. Suitably mounted in the sides of the shell are the pivot bolts 23, upon which are pivotally supported side arms of the hood or cover 24, adapted when in closed position to cover the outermost, or open end of the casing to protect the electric contact plates and mechanism within the chamber of the shell against ingress of dirt, rain, snow or the like, while at the same time preventing the possibility of effecting a coupling up therewith of the coupling mechanism on an adjacent car until the cover is raised. The closed position of the cover we may refer to as its normal position when the coupling mechanism is not in use for coupling up to the adjacent car.

It may be desirable to close one or more of the car line circuits, in the coupling mechanism, only when the cover 24 is in its normal or closed position, and to open said circuit by the act of raising the cover; this is desirable in the case of the signaling circuit, for instance. To accomplish this result, we connect a contact device 25, to move with the cover 24, as shown in the right hand portion of Fig. 4, which contact coöperates with a finger 26, suitably connected electrically through wire 27, with the car wire line of the signaling circuit, and adapted to close this circuit when the contact 25, and finger 26, are brought into bearing relation with each other, and to be opened when said contact and finger are separated, the relation being such, that the contact and finger are brought into bearing relation only when the cover is closed, and are separated when the cover is raised as will be clearly understood by reference to Fig. 4. This arrangement enables the signaling circuit to be closed at the rear end of the rear car of a train, thereby establishing the integrity of that circuit throughout the train, and consequently requiring, for instance, the closing of all doors of the train before the signaling circuit is completed to the motorman. It also insures the extension of the signaling circuit to another car when such other car is added to the train, since, as will be understood, the cover must be raised when such other car is coupled up or added to the train.

The cover 24, is provided with bosses or projections 28, at the sides thereof, adapted to work within a cam groove or slot 29 in the operating slides 22. The bosses 28 on the cover, are so positioned with reference to the axis 23 of the cover, as clearly shown, that when an operating slide 22, is shifted endwise in the housing chamber from its normal outermost position, as seen at the left hand side of Fig. 4 toward the inner end of the housing chamber, that is, toward the position indicated at the right hand of Fig. 4, and at both ends of Fig. 1, the cover 24 is rotated or swung from its closed, to its raised or open position.

Various means may be employed for shifting the operating slide 22 from its normal or outermost position. We have shown a simple arrangement for accomplishing this result by the act of coupling up or bringing the ends of the cars together, wherein we employ an alining plate or link 30. The placing of this plate in position to perform its function of shifting an operating slide 22 involves the manual operation above referred to. When it is desired to couple up two cars, or to add a car to a train, the cover 24 of the coupling mechanism on the end of one of the cars is raised by hand or manual manipulation, and an alining plate or link 30 is inserted edgewise in one or the other of the housing chambers of the coupling mechanism, and is fastened therein in any suitable or convenient manner, as, for instance, by inserting a pin or stud laterally through a boss 31 on the outer surface of the housing 21, on one side or the other of the shell, and into a corresponding hole in the alining link. This involves the manual operation, as above indicated, of raising the cover, inserting the alining plate into the housing chamber, and securing it therein, with the end of the alining link projecting outwardly from the shell or casing, and in position to enter or to be received lengthwise in the corresponding housing chamber of the shell or casing on the proximate end of the adjacent car. It will be understood that the covers, 24, do not extend over the outer opening of the housing chambers, which are open to receive the alining links, but when a link is to be manually inserted, the cover of the coupling member is also raised manually in order to facilitate the insertion of the link.

To facilitate the entrance of the projecting end of the alining link into the housing chamber of the coupling mechanism on the adjacent car, and to insure such entry, notwithstanding the ends of the cars may not be in exact line with each other, we prefer to form the projecting end of the alining link tapering, as clearly shown in the drawings. With the alining link thus secured in the housing chamber of one of the coupling mechanisms, the act of bringing together the ends of adjacent cars causes the alining member to enter the housing chamber of the coupling mechanism on the adjacent car, and to shift the operating slide 22, thereby, through the engagement of the projection 28, of the cover 24, with the cam slot 29 in the operating slide, causing the cover plate to be raised from its normal closed position, into open position to permit the coupling to be accomplished. It will be understood of course, that while we have provided an operating slide on each side of the casing of each coupling mechanism, in the operation of the device it is necessary to shift only one of these operating slides; that is, it is necessary to apply power to effect the shifting to only one of the slides. Therefore, only one alining plate is employed. Carried by each operating slide 22, is a pin 32, which extends through a slot 33, in the side walls of the shell or casing. This pin 32, of one of the slides operates in a slot 34 in the end of a link 35 mounted at one side of the casing. The travel of pin 32 that is, the travel of the slide 22 is greater than the length of the slot 34, in link 35, as clearly indicated at the left hand portion of Fig. 4, so that when the operating slide 22, begins its shifting movement to the left in effecting a coupling of cars, the pin 32, rides freely through slot 34, without performing any function with reference to link 35. During the preliminary movement, however, the cover, 24, is partially raised by the movement of the projection, 28, in the cam slot, 29, of the slide. Before the pin 32 reaches the limit of its travel toward the left, it engages the inner wall of slot 34, thereby and thereafter causing link 35 to be shifted endwise coincidently with the continuation of the movement of pin 32 and the slideplate 22, which carries it. The link 35 is connected to one arm 36, of a bell crank lever, the other arm 37 of which supports the contact carrier indicated generally by reference numeral 38, the bell crank lever referred to, being pivoted as at 39. Thus when the bell crank arm 36 is rocked the contact carrier 38, is lowered from the position indicated in dotted lines at the left hand end of Fig. 4, into the position shown in full lines at the left hand end of Fig. 1, the cover 24 being simultaneously and coincidently raised to its full open position. When the contact carrier 38 is lowered into the position shown in full lines in Fig. 1, proper circuit connections are completed between the car line circuits of the cars being coupled.

When the operating slide 22 is again moved outwardly in the housing chamber, or from the position thereof as shown in the left hand portion of Fig. 1, toward the position indicated in the left hand portion of Fig. 4, the pin 32 on the operating slide travels idly through the slot 34 in the end of link 35 without performing any function with reference to said link. When the pin 32 reaches the limit of slot 34 the continued travel of the pin 32 causes the link 35 to be shifted endwise thereby again rocking the arm 36 of the bell crank lever which carries the contact carrier 38, thereby again rocking the contact carrier into raised position, or from the position thereof shown in full lines at the left hand portion of Fig. 1, into a position thereof indicated in dotted lines in the left hand end of Fig. 4. The same travel of operating slide 22 acting upon the projection, 28, causes the cover 24 to be lowered into its normal or closed position over the end of the casing.

It is desirable to provide means for returning the operating slide 22, to its normal advanced position to maintain the contact carrier raised and the hood or cover 24 lowered, and since the raised position of the contact carrier, and the lowered position of the hood or cover are the normal positions of these parts, it is desirable that these parts be restored automatically to their normal positions after having been operated in effecting a coupling up of the cars. In one form of means for accomplishing this purpose, we connect one of the ends of each of arms 40 to the pins 32 of the operating slides, the other ends of these arms being swiveled upon a rod or bolt 41, upon which is carried a suitable retracting spring 42, see Fig. 3, the arrangement being such that when the operating slide 22 is moved inwardly into the housing chamber such movement is against the tension of spring 42, which tends to restore the operating slide to its normal or outermost position. This return is necessary in order to complete the car starting signal circuits as above explained, and in case the cover and contact carrier are not automatically restored to normal positions the failure to accomplish a starting signal will at once indicate the failure and hence call attention thereto.

It may be desirable to lock one of the actuating slides 22, while the other one is in operation, to prevent using operating links in both sides of a coupling mechanism which would prevent a coupling operation being made.—To accomplish this result, we employ a locking bar 43, arranged to extend transversely through the shell or casing chamber with the ends thereof projecting through slots in the side walls of the shell and into a slot 44, formed in the operating slides as most clearly shown in Figs. 3, 5, 6 and 7, the recesses of slots 44, are provided with an inclined wall portion or surface, which terminates in a shoulder 46, at the point of greatest depth of the recess 44. In the normal position of the locking bar 43, the ends thereof clear the shoulders 46 of the operating slides so that either of said slides is free to be shifted. When one of said slides is shifted however, the inclined surface 45, of recess 44, engages the corresponding end of locking bar 43, thereby shifting the latter longitudinally and in a direction transverse to the length of the shell or casing and into position for the other end of the locking bar to be forced into the deepest portion of the recess 44, in its associated operating slide, and into position to engage behind the shoulder 46, thereby forming a lock to prevent said operating slide from being shifted. In accordance with our invention we employ convenient means for normally maintaining the locking bar in central position. One arrangement for accomplishing this result is shown wherein a casting 50 is inserted through the bottom wall of the shell and has formed thereon, or attached thereto, lugs 51, see Figs. 3 and 5, suitably spaced apart transversely of the casing or shell. Carried by the lugs 51 is a pin 52 upon which is mounted a spring 53, held in compression between said lugs. Interposed between each lug and the adjacent end of the spring is a movable washer 54, the washers being capable of free movement along the rod or pin 52. The locking bar 43 is longitudinally slotted as indicated at 55, the lugs 51 extending through said slot 55. The slot 55 is formed with a shoulder 56 at each end thereof, adapted when the locking bar is shifted endwise in one direction or the other, to engage the washer 54 at that end of the pin 52, nearest that side of the casing which contains the operating slide through the movements of which the locking lever is shifted. By this arrangement it will be seen that when the locking bar is shifted in either direction into position to form a lock for one of the operating slides the shifting movements of said bar are against the action of the compression spring 53, the tension of which is constantly exerted tending to hold the locking bar in central position.

We have above described that each car is equipped with a line of train wires or circuits. These line wires or circuits are suitably connected to spring or other suitable form of contact fingers 58, the wires themselves being indicated at 59. The contact carrier 38, coöperates with the contact fingers 58, when two cars are coupled together and the contact carrier is rocked from its raised position, as seen for instance in Fig. 4, into its lowered position as shown in full lines in Fig. 1, as above described. The contact carrier is composed of contact members coöperating with the fingers 58, and there should be of course as many contact members of the carrier and coöperating fingers 58, in each coupling mechanism, as there are car or train line wires or circuits to be coupled up, and the contact members of the carrier should be so cross-connected with respect to each other that when two cars are coupled and the automatic circuit coupling mechanism thereon are brought into coöperating relation with respect to each other, the wires or lines on one car are coupled electrically to the respectively corresponding wires or lines on the other car. The manner of cross-connecting the contact members of the contact carrier to accomplish this result is a matter of workshop practice and will be readily understood and comprehended by those skilled in the art.

The contact carrier and its associated parts may be of any suitable or convenient or desired construction and arrangement. We have shown a simple and efficient construction thereof, the various details being indicated in Figs. 9 to 15 inclusive. The carrier which, as above indicated, we have designated generally by reference numeral 38, comprises side members 37, one of which forms the arm of the bell-crank lever through which the carrier is operated. The side members 37 on opposite sides of the chamber of the shell carry the rods or bolts 61—62 upon which are strung the insulating separators and arc shields as well as the contact portions or members. The contact members comprise metal electrically conducting plates 63. These plates are provided with extending lugs 64, see Fig. 9, to facilitate the proper electrical cross-connections thereof. Each plate 63, is also provided with a flange 65 with which the contact fingers 58 coöperate when the contact carrier is in coupling relation with respect to said fingers. The contact plates 63 are strung upon the supporting bolts 61 but are insulated therefrom by an insulating block 66, carried by said bolts, said insulating blocks being received in openings 67, in the contact plates. The contact plates 63 should correspond in number to the contact fingers 58 and consequently to the car line wires of the circuits to be coupled. When the ends of two adjacent cars are brought together and the automatic coupling mechanism is operated it is obvious that while the coupling mechanism on each car at the ends thereof which come together, contains a contact carrier, the contact carrier only on one car will be operated, that is, the alining member or link 30 will be inserted in the coupling mechanism on only one of the cars and that member will then actuate the coupling mechanism on the other car so that one of the contact carriers 38 will remain retracted and inactive while the contact carrier of the other coupling mechanism will be operated. If the alining link is inserted at the side to engage with and hold the slide which is not connected with the link, 35, as indicated at the right in Fig. 4, the contact carrier will remain in its retracted position, as shown, but the alining link will then operate to engage the slide of the counterpart coupling, which is connected with its link, 35, and move the contact carrier of its coupling member forward into its active position when the adjacent cars are brought together for coupling. If, however, the alining link be inserted at the side having the connecting link, 35, the act of raising the cover and inserting the alining link will cause the slide to move inward and actuate the link, 35, so as to throw the contact carrier forward to its operative position ready to make contact with the electric contact plates of the other coupling member. Then when the two cars are brought together, the alining link engages the slide of the other coupling member and raises the cover as before described, but does not actuate the contact carrier. It will also be obvious that a contact finger 58 of one coupling mechanism will not necessarily be placed in electrical communication with the contact finger 58 of the other coupling mechanism which lies directly opposite it, since the line wire circuits of the one coupling mechanism do not necessarily come directly opposite the same line wire circuits of the other coupling mechanism. This is the reason why the contact plates 63 are required to be cross-connected. The contact plates 63 are separated by intervening separator insulating plates 68, and insulating shield plates 69. The function of the shield plates 69 is to prevent arcing between adjacent contact fingers, and to furnish creeping surface distance between adjacent contacts; the shield plates being of greater length than the separator plates 68. The contact flanges 65 of the contact plate 63 extend over the edges of the separator plates 68, as clearly shown. Two sets of contact plates, separator plates, and shield plates are employed, one set being carried by the rod 61, and the other by a rod 62 as clearly shown.

While we have shown and described a specific structure of contact mechanism, our invention as defined in the claims is not to be limited or restricted in respect to the construction shown and described.

From the foregoing description, it will be seen that we provide a simple automatic electric coupling mechanism for the ends of cars which is normally housed and inclosed against access of dirt, dust, rain, snow or the like, and which requires manual manipulation in order to permit the car ends to be coupled together. In other words, the cars cannot be coupled together unless and until the housing cover 24 of the coupling mechanism at the end of one of the cars to be coupled up is raised, and the act of coming together of the car ends to be coupled together, after the manual attention referred to has been given, effects the raising of the cover of the other coupling member, and the proper electrical coupling of the car line circuits and in proper order to extend the integrity of each circuit to the added or coupled on car. It will also be seen that in uncoupling the cars the cover on the coupling mechanism of one of the uncoupled ends will be automatically closed while that on the other uncoupled end will remain raised as long as the link so remains therein, but since the starting signal circuit cannot be coupled on that car until said cover is lowered attention will at once be called to the failure to remove the link by a failure to give a starting signal.

We have above referred to the cross-connections of contact members or plates 63. The separator and shield insulating plates 68—69 are provided with registering recesses 70 to accommodate these cross-connections.

It is believed that the operation of the apparatus will be fully understood from the foregoing description taken in connection with the accompanying drawings.

The casing or shell containing the coupling mechanism above described is designed to be supported in any suitable or convenient position at the end of the car. In practice we may support the shell or casing yieldingly so as to prevent breakage when car ends come together for coupling up. We also prefer to locate the shells or casing containing the coupling mechanism below the usual coupling draw-bar or draw head employed in coupling up cars.

Having now set forth the objects and nature of our invention, and a construction embodying the principles thereof what we claim as new and useful and of our own invention and desire to secure by Letters Patent is:—

1. In an automatic electrical coupling mechanism for cars, a shell or casing, coupling mechanism mounted therein, a cover for the shell or casing, the coupling mechanism being normally retracted out of operative position when the cover is closed, and means operated by the bringing together of car ends to couple the cars, for raising the cover and actuating the coupling mechanism.

2. In an automatic electrical coupling mechanism for cars, a shell or casing, contact devices mounted therein and normally held out of operative relation, an operating slide arranged within the casing and adapted when actuated to move the contact devices into operative relation, and a fixed projection carried by the proximate end of an adjacent car to be coupled up, operating when the car ends are brought together to actuate said slide.

3. In an automatic electrical mechanism for cars, a shell or casing, movable contact devices mounted therein and normally held out of operative relation, fixed contacts also mounted in said casing, means for bringing said contact devices into operative relation, and operating devices carried by the proximate end of an adjacent car, and operative when the car ends are brought together, for actuating said contact moving means.

4. In an automatic electrical coupling mechanism for cars, a casing, a movable contact carrier arranged therein and normally maintained out of operative relation, fixed contacts also mounted in said casing, an engaging device carried by the proximate end of an adjacent car, and adapted when the car ends are brought together to be coupled up to move said contact carrier into operative position.

5. In an automatic electrical coupling mechanism for cars, a casing, a movable contact mechanism arranged therein, and normally held out of operative relation, a movable cover for the casing, and means carried by the proximate end of an adjacent car adapted when the car ends are brought together to be coupled up, to move the cover and shift the contact carrier into operative relation.

6. In an automatic electrically coupled mechanism for cars, a casing, a contact carrier pivotally mounted within said casing, an operating slide therefor, means for normally retaining the contact carrier out of operative relation, and a fixed projection carried by the proximate end of an adjacent car adapted when the car ends are brought together to be coupled up, to engage said operating slide to rock the carrier into operative relation.

7. In an automatic electrical coupling mechanism for cars, a casing, a movable contact carrier arranged therein and normally held out of operative relation, an operating member, lost motion connections between said operating member and the contact carrier for moving the latter, and means carried by the proximate end of an adjacent car, adapted, when the car ends are brought together to be coupled up to engage said operating member and actuate the same.

8. In an automatic electrical coupling mechanism for cars, a casing, a movable contact carrier arranged therein, a movable cover for the casing, an operating member arranged within the casing, connections between the said operating member and contact carrier and cover, whereby when the operating member is moved, the cover is shifted and the contact carrier moved into operative relation, and means carried by the proximate end of an adjacent car adapted when the car ends are brought together to be coupled up to engage said operating member to actuate the same.

9. In an automatic electrical coupling mechanism for cars, a casing, a movable contact carrier arranged therein, a cover for the casing, an operating member associated with the casing, connections between the operating member and the cover for shifting the latter, lost motion connections between the operating member and the contact carrier for moving the latter into operative relation, and means carried by the proximate end of an adjacent car adapted when the car ends are brought together, to be coupled up to engage the operating member to actuate the same.

10. In an automatic electrical coupling mechanism for cars, a casing, a movable contact carrier arranged therein and having contacts for engaging corresponding contacts of the counterpart coupler, an operating member connected to said carrier to move the same, means for yieldingly resisting the operation of said operating member, and a fixed projection carried by the proximate end of an adjacent car adapted when the car ends are brought together to be coupled up, to engage said operating member to move the same against said resisting means.

11. In an automatic electrical coupling mechanism for cars, a casing, a movable carrier arranged therein, a cover for the casing, an operating member connected to said cover and carrier to move them, means for yieldingly resisting the operation of said operating member, and means carried by the proximate end of an adjacent car adapted, when the car ends are brought together, to be coupled up to engage said operating member and move the same against the action of said resisting means.

12. In an automatic electrical coupling mechanism for cars, a casing, contact mechanism arranged therein, a cover for said casing, an operating member having a cam slot, means carried by the cover to engage in said slot, whereby when said operating member is moved, said cover is shifted, and means carried by the proximate end of an adjacent car adapted, when the car ends are brought together, to be coupled up, to engage and move said operating member.

13. In an automatic electrical coupling mechanism, for cars, a casing, contacts arranged therein, a cover for the casing, an operating member for the cover and having a cam slot, means connected to the cover for engagement with said slot, means for yieldingly resisting the movement of said operating member, and means carried by the proximate ends of an adjacent car adapted when the car ends are brought together to be coupled up, to engage said operating member and move the same against the action of said resisting means.

14. In an automatic electrical coupling mechanism for cars, a casing, contact mechanism arranged therein, an operating member for moving said contact mechanism into and out of operative relation, a housing chamber in which said operating member operates, spring resisting devices connected to the operating member to resist the displacement thereof in said chamber, and means carried by the proximate end of an adjacent car adapted, when the car ends go together to be coupled up, to engage said operating member to move the same against the action of said spring.

15. In an automatic electrical coupling mechanism for cars, a casing, contact mechanism arranged therein, a cover for said casing, operating slides for shifting said cover, and means whereby when one of said slides is operated to shift said cover the other slide is locked.

16. In an automatic electrical coupling mechanism for cars, a casing, a cover therefor, housing members arranged on opposite sides of the casing, an operating member arranged within each housing and connected to the cover to shift the same, and means for locking one of said operating members when the other is moved to shift the cover.

17. In an automatic electrical coupling mechanism for cars, a casing, contact mechanism arranged therein, a cover for said casing, an operating member arranged on each side of the casing and each connected to said cover to shift the same when moved, means for locking one of said operating members when the other is actuated, and means carried by the proximate end of an adjacent car adapted when the car ends are brought together to be coupled, to engage one of said members to move the same.

18. In an automatic electrical coupling mechanism for cars, a casing, a contact carrier arranged therein, a cover for said casing, operating members arranged at opposite sides of the casing and connected to the cover to shift the same, a locking bar, means for centering said bar, and means whereby when one of said operating members is moved the said locking bar is shifted out of centered position and into locking relation with respect to the other operating member.

19. In an automatic electrical coupling mechanism for cars, a casing, a contact carrier arranged therein, and having a crank arm, a rod connected to said crank arm, an operating member, engaging connections between said member and rod whereby when said operating member is moved said contact carrier is moved, means normally operating to resist the movement of said operating member, and means carried by the proximate end of an adjacent car adapted, when the car ends are brought together, to be coupled up, to engage said operating member to move the same against the action of said resisting means.

20. In an automatic electrical coupling mechanism for cars, a casing, a movable contact mechanism arranged therein, an operating member therefor, a housing for said operating member, and an alining member carried by the proximate end of an adjacent car and adapted when the car ends are brought together to be coupled up, to enter said housing and engage and move said operating member.

21. In an automatic electrical coupling mechanism, for cars, a casing, contact mechanism arranged therein, a cover for said casing, an operating member for said cover, a housing for said operating member, and an alining member carried by the proximate end of an adjacent car and adapted, when the car ends are brought together to be coupled up to enter said housing and engage and actuate said operating member.

22. In an automatic electrical coupling mechanism, for cars, a casing, a contact carrier arranged therein, a cover for said casing, an operating member connected to said cover and said carrier, a housing for said operating member, and an alining member carried by the proximate end of an adjacent car and adapted when the car ends are brought together to be coupled up to enter said housing and engage and actuate said operating member.

23. In an automatic electrical coupling mechanism, for cars, a casing, a movable contact mechanism including a contact device, a circuit including a coöperating contact finger, a cover for said casing, said contact finger adapted to be brought into bearing relation when the cover is in closed position to close said circuit, and means for shifting said cover into open position to break said circuit.

24. In an automatic electrical coupling mechanism for cars, a casing, a contact mechanism arranged therein and including a movable contact, a circuit including a finger adapted to coöperate with the said contact, a cover for the casing operating when moved into closed position to shift said contact into coöperative relation with respect to the finger to close said circuit and when moved into open position to break said circuit, and means carried by the proximate end of an adjacent car, adapted, when the car ends are brought together to be coupled up, to shift the cover into open position.

25. In an automatic electrical coupling mechanism for cars, the combination of a casing adapted to be supported upon the end of a car, contact devices mounted therein and normally held out of operative position, and means operated by the coming together of the coupling casings of adjacent cars for effecting the movement of the contact devices of one coupler only to the operative position.

26. In an automatic electrical coupling mechanism for cars, the combination of a casing adapted to be supported upon the end of a car, a movable contact carrier mounted in a normally inoperative position in said casing, a movable member operatively connected to said carrier, contact fingers mounted in said casing and connected to the respective train line circuits, and means operated by the coming together of the coupling casings of adjacent cars for actuating said movable member and shifting the contact carrier into its operative position for engaging said contact fingers.

27. In an automatic electrical coupling mechanism for cars, the combination of a casing adapted to be supported upon the end of a car, a movable contact carrier mounted in a normally inoperative position in said casing, a movable member operatively connected to said carrier, contact fingers mounted in said casing and connected to the respective train line circuits, and means for actuating said movable member to shift the contact carrier to its operative position to establish electrical connection with the contacts of a counterpart coupling mechanism on an adjacent car.

28. In an automatic electric coupling mechanism for cars, the combination of a casing adapted to be mounted upon the end of a car, contact devices in said casing, a cover for the casing, and means operated by the coming together of the adjacent cars for shifting said cover to open position.

29. In an automatic electric coupling mechanism for cars, the combination of a casing adapted to be mounted on the end of a car, contact devices in said casing, a cover for the casing, a movable member operatively connected with said cover, and means operated by the coming together of the adjacent cars for actuating said movable member to shift said cover to its open position.

30. In an electric coupling mechanism, the combination of a casing adapted to be supported at the end of a car, fixed contacts mounted in said casing and connected to the respective electric train line circuits, a movable contact member also mounted in said casing and normally held out of operative position, and means for shifting said contact member to the operative position to establish electrical connection between said fixed contacts and the corresponding fixed contacts of a counterpart coupling on the adjacent car.

31. In an electrical coupling mechanism, the combination of a casing having an opening at its end, fixed contacts mounted in said casing and connected to the respective electric train line circuits, a movable contact member also mounted in said casing and normally held out of operative position, and means for shifting said contact member to the operative position and extending through said opening to establish electrical connection between said fixed contacts and the corresponding fixed contacts of a counterpart coupling on the adjacent car.

32. In an electric coupling mechanism, the combination of a casing adapted to be supported at the end of a car, fixed contacts mounted in said casing and connected to the respective electric train line circuits, a movable contact member also mounted in said casing and normally held out of operative position, and means operating automatically upon the coming together of the coupling casings of adjacent cars to shift said contact member to the operative position to establish electrical connection between said fixed contacts and the corresponding contacts of the adjacent coupling.

33. In an electric coupling mechanism, the combination of a casing having an opening at its end, fixed contacts mounted in said casing and connected to the respective electric train line circuits, a movable contact member also mounted in said casing and normally held out of operative position, a movable cover for said openings, and means for shifting said cover to the open position, and for extending said contact member through said opening to establish electrical connection with the corresponding contacts of a counterpart coupling on the adjacent car.

34. In an electric coupling mechanism, the combination of a casing having an opening at its end, fixed contacts mounted in said casing and connected to the respective electric train line circuits, a movable contact member also mounted in said casing and normally held out of operative position, a movable cover for said opening, and means operating automatically upon the coming together of the coupling casings of adjacent cars to shift said cover to the open position and to extend said contact member through said opening to establish electrical connection with the corresponding contacts of the adjacent coupling.

35. In an electric coupling mechanism, the combination of a casing adapted to be supported at the end of a car, a plurality of fixed contacts mounted in said casing, upon opposite sides of a vertical center line and connected to the respective train line ciricuits, a movable contact carrier also mounted in said casing and having a plurality of contacts cross connected upon opposite sides of the center, and means for shifting said contact carrier to the position to establish electrical connection with the corresponding contacts of the adjacent coupling.

In testimony whereof we have hereunto set our hands in the presence of the subscribing witnesses, on this 17th day of January A. D., 1912.

JAMES S. DOYLE.
FRANK HEDLEY.

Witnesses:
H. M. NORRIS,
S. E. DARBY.